T. D. PRICE.
Seed Planter.
No. 59,263.
Patented Oct. 30, 1866.
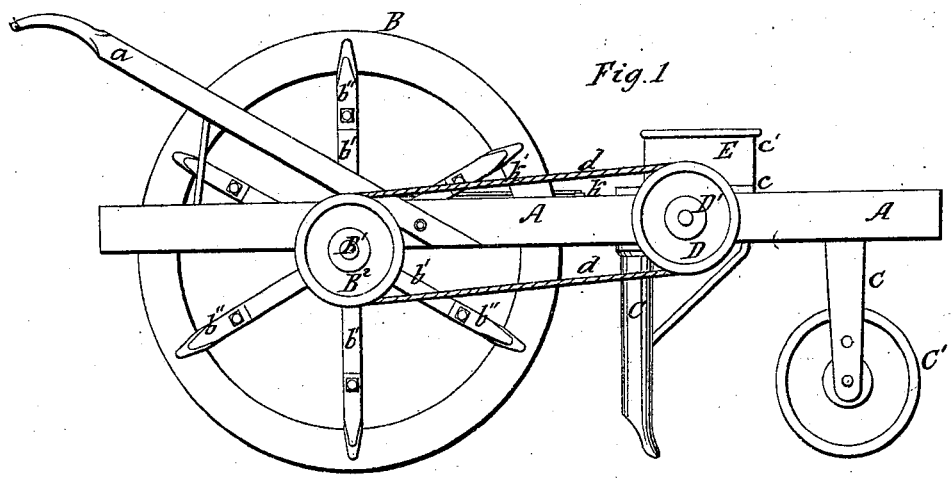
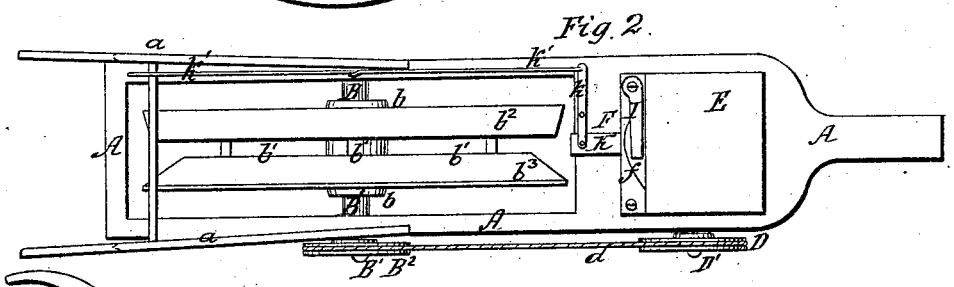
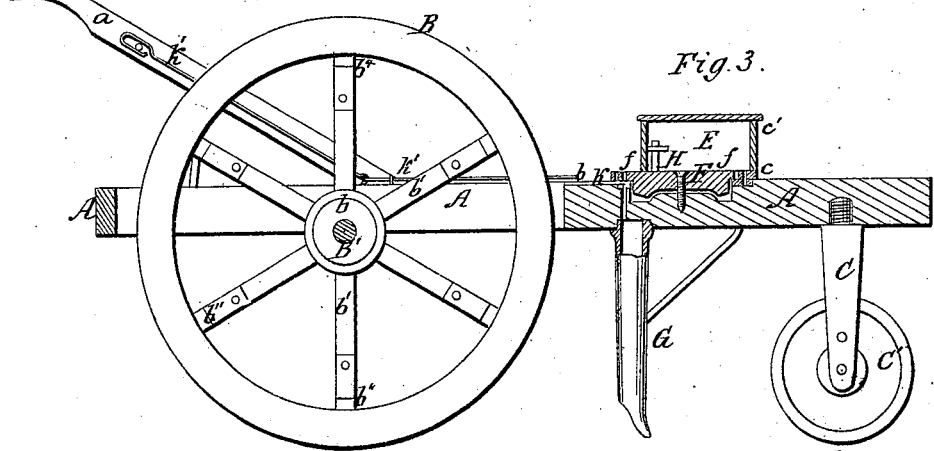
Witnesses:
S. M. Randolph.
Chas. H. Boyle.
Inventor:
T. D. Price.
By his attys
M. Randolph & E.

UNITED STATES PATENT OFFICE.

THOMAS D. PRICE, OF CARROLLTON, ILLINOIS.

IMPROVEMENT IN SEED-DRILLS.

Specification forming part of Letters Patent No. 59,263, dated October 30, 1866.

*To all whom it may concern:*

Be it known that I, THOMAS D. PRICE, of Carrollton, in the county of Green and State of Illinois, have made certain new and useful Improvements in Seed-Drills; and I do hereby declare that the following is a full and clear description thereof, reference being had to the accompanying drawings, and to the letters of reference marked thereon.

Figure 1 of the drawings is a side elevation of the improved drill. Fig. 2 is a plan of the same, and Fig. 3 is a central sectional elevation.

This invention relates, first, to the covering-wheel, and also to the combination therewith of a horizontal revolving disk for conveying the seeds to be planted out of the hopper; secondly, to the arrangement and construction of the seed-disk, and also, in combination with this, of certain devices for preventing the seed from clogging or remaining in the pockets of said disk longer than is necessary to convey them to the dropping-tube.

To enable those skilled in the art to make and use my improved seed-drill, I will proceed to describe its construction and operation.

A is a horizontal frame, which serves as a general support for the other parts of the machine. The principal portion of the frame A rests on the covering-wheel B; but the forward end of the said frame rests upon the stand C, in the lower end of which is a single wheel, C'.

It is intended that this machine shall be operated by a person walking after it, and consequently there are handles $a\ a$ attached to the frame A in such a position as to readily enable the person so employed to seize them and control the machine.

The wheel B has its shaft B' placed across the frame A, in which frame the said shaft finds its bearings. The wheel itself is made up of the hub $b$, the arms $b^1$, and the two annular covering-rims $b^2$ and $b^3$, which are connected with and bolted to the arms $b^1$ by means of the short radial arms $b^4$.

The two rims $b^2\ b^3$ are placed at some distance—say, two or three inches, more or less—apart; and to make this interval continuous entirely around the wheel, the arms $b^1$ are not allowed to extend to the periphery of the wheel, but are cut off just long enough to receive the arms $b^4$, which are bolted to them.

The rim $b^2$ is intended to travel on one side of the planted row, and the rim $b^3$ on the other side of it, and as the two rims are beveled off on their faces so as to make the said rims largest on the outsides of them, as shown in the plan, the operation of the wheel, as it is rolled over the ground, will be to force the ground together into a ridge and leaving it loose or unpacked immediately over the seeds that have previously been dropped in the proper position to be thus covered, as will be hereinafter more fully explained.

As it is intended to use this machine for different kinds of seeds, and as such different kinds of seeds will in different soils require different coverings, I propose to adapt this machine to all such various changes as may become necessary by supplying each machine with a number of pairs of the rims $b^2\ b^3$, differing from each other only in the angle of inclination of the beveling. Thus, in Fig. 2 it will be seen that the rim $b^2$ is more nearly flat than the rim $b^3$.

As the rims are fastened to the spokes or arms $b^1$ by means of screw-bolts passing through those arms and the short arms $b^4$, it will be an easy matter to put on a pair of rims of more or less bevel, such as may be best adapted to the work in hand.

I am aware that wheels formed of two covering-rims more or less inclined to each other have before now been in use; but what I especially claim as my invention is the construction of the wheel B in parts, so that different rims, with more or less bevel, may be employed as occasion may require.

On one end of the shaft B' there is a belt-wheel, B², and from this belt-wheel there is a belt, $d$, which communicates motion to the counter-wheel D. This counter-wheel is located upon the outer end of the counter-shaft D', which is placed across the forward end of the frame A, directly below the axis of the seed-box E.

On top of the frame A, and below the seed-box E, is a horizontal revolving disk, F, perforated with holes for seed-pockets $f$. This disk is rotated by means of cog-gearing cut into or attached to its bottom face, but not shown.

The said cogged gearing is actuated by means of a cogged pinion (also not shown) on the inner end of the counter-shaft D'. Thus it will be seen that as the machine is drawn forward the revolving wheel B will, through the medium of the wheels $B^2$ and D, the belt $d$, and the aforesaid concealed cog-gearing, transmit motion to the disk F. This disk is nearly, but not quite, covered by the seed-box E. A small segment of the disk extends behind the said seed-box, so as to allow the driver to see if its pockets are filled or not, thus enabling him to see and know the precise moment the machine ceases to act.

Farmers who have experienced the great difficulty and expense of having to replant a crop, owing to the use of machines that frequently missed planting, to say nothing of the loss of crop, will realize the importance of this feature of this machine.

An orifice in the frame A, back of the seed-box and directly in front of the wheel B, will allow the seed to drop down through the tube G into the furrow that has been marked by the wheel C', and there it is prepared to be covered by the wheel B.

The seed-box is hinged to the frame A at $e$, and the cover of the box to the box at $e'$, so that these parts may readily be turned over so as to get at and repair the disk F.

As this machine is intended to plant all kinds of seeds, it may become necessary to make the pockets $f$ nearer together or farther apart. This I accomplish by fitting plugs into the said pocket-holes and fastening them into, say, every other hole or pocket, or more of them, if desired. These plugs are not shown; but any person at all familiar with this class of machinery can easily construct and use them.

To prevent seed from clogging between the disk F and the forward end of the box, I place a brush, H, or something similar in such a position as to scrape off any seed that may be partially in any of the pockets, but projecting above the top surface of the disk, before the same can be carried under the side of the box. I also place a spring, I, over the said pockets, in front or outside of the box E, in such a position as to force the seeds from the pockets down into the tube G. The orifice over the tube G may be closed by means of the gate K, which is operated by the driver by means of the rods $k$ and $k'$. By this arrangement the driver may let the seeds drop when he wishes by simply opening the said gate, or by closing it he can stop planting.

Having described my invention, what I claim is—

1. The covering-wheel B, when constructed with the adjustable rims $b^2$ and $b^3$, substantially as and for the purpose described and set forth.

2. The covering-wheel B, in combination with the disk F, when these two parts are constructed so as to operate conjointly, as herein described and set forth.

3. The disk F, in combination with the brush H and spring I, for the purpose of preventing the clogging or stoppage of the seeds, as described and set forth.

4. The arrangement of the gate K and its operating devices, substantially as herein described and set forth.

THOMAS D. PRICE.

Witnesses:
M. RANDOLPH,
S. M. RANDOLPH.